United States Patent [19]
Kaelin

[11] 3,875,279
[45] Apr. 1, 1975

[54] SURFACE VENTILATION ROTOR

[76] Inventor: Joseph Richard Kaelin, Villa Seeburg, 6374 Bouchs, Switzerland

[22] Filed: Nov. 21, 1972

[21] Appl. No.: 308,599

[30] Foreign Application Priority Data
Nov. 22, 1971 Switzerland.................... 17042/71

[52] U.S. Cl..................... 261/91, 416/186, 261/93
[51] Int. Cl............................................. B01f 3/04
[58] Field of Search ............... 261/91, 93; 416/186

[56] References Cited
UNITED STATES PATENTS

| | | | |
|---|---|---|---|
| 1,835,559 | 12/1931 | Cutler | 261/91 |
| 2,079,574 | 5/1937 | Lea | 261/91 |
| 3,235,233 | 2/1966 | Bolton | 261/91 |
| 3,273,865 | 9/1966 | White | 261/91 |
| 3,462,132 | 8/1969 | Kaelin | 261/91 |
| 3,470,092 | 9/1969 | Bernard | 261/91 |
| 3,478,691 | 11/1969 | Henry | 416/186 |
| 3,576,316 | 4/1971 | Seeburg et al. | 261/91 |
| 3,610,590 | 10/1971 | Kaelin | 261/91 |
| 3,780,998 | 12/1973 | Botsch | 261/91 |

FOREIGN PATENTS OR APPLICATIONS

| | | | |
|---|---|---|---|
| 7,007,204 | 11/1970 | Netherlands | 261/91 |
| 1,173,254 | 12/1969 | United Kingdom | 261/91 |
| 449,091 | 9/1927 | Germany | 261/91 |
| 619,374 | 3/1949 | United Kingdom | 416/186 |

Primary Examiner—Tim R. Miles
Attorney, Agent, or Firm—Oblon, Fisher, Spivak, McClelland & Maier

[57] ABSTRACT

A surface ventilation rotor for adding air to waste water which is to be clarified has two concentric blade sets arranged radially adjacent to each other. A dividing wall is provided between adjacent blade sets.

9 Claims, 11 Drawing Figures

SURFACE VENTILATION ROTOR

The present invention relates to a surface ventilation rotor for adding oxygen or an oxygen mixture to a liquid, in particular with waste water which is to be clarified.

Surface ventilation rotors provided with blade sets are already known, but these have the disadvantage that their size and their weight show a sharp increase as the amount of oxygen introduced increases. They further have the disadvantage that various support parts for the blade sets are required for various quantities of introduced oxygen for a given speed, and this is very expensive and complicated.

An object of the invention is to provide a surface ventilation rotor which does not have these disadvantages, in other words one in which the size and the weight do not show a sharp increase as the amount of oxygen introduced increases, and in which the same support member for the blade sets may be used for ventilation rotors of differing capacity.

According to the invention there is provided a surface ventilation rotor for adding oxygen or an oxygen mixture into waste water which is to be clarified, said rotor being provided with at least two blade sets, concentric in respect of each other and housed adjacent to each other in radial alignment, a dividing wall being provided between any two adjacent blade sets.

It is thus possible to house one or more blade sets concentrically in respect of each other on the same blade set supporting member.

It is advantageous if, when the axis of rotation runs vertically, the innermost set face forms a number of conveyor channels which are curved in vertical planes in such a way that liquid entering from below into the conveying channels is deflected by about 90° in these channels and leaves in approximately horizontal direction at the periphery of the rotor.

It is expedient if at least one part of the conveyor channels formed between the individual blades is connected via connecting channels to the top side of the rotor, so that as a result of the suction effect of the liquid flowing through the conveyor channels a region of lower pressure than ambient pressure is produced at the mouth of the connecting channels located in the conveyor channels and there is sucked in by means of this lower pressure region oxygen or an oxygen mixture which is mixed with the liquid flowing through the conveyor channels.

In order to achieve utmost simplicity of design it is advantageous if from at least one part of the blade sets, the limiting walls of the conveyor channels located on the inside and outside, when seen in radial direction lie in planes having at least approximately the shape of frustoconical generated surfaces.

The invention is further described in the following by way of example with the help of the drawing, in which:

FIGS. 1 to 10 show various embodiments, partially in section, of surface ventilation rotors according to the invention; and FIG. 11 is a plan view of a surface ventilation rotor according to the invention.

As can be seen from FIG. 1, the illustrated surface ventilation rotor has two blade sets 1 and 2, concentric relative to each other and housed adjacent to each other in radial alignment, a dividing wall 3 being provided between the two adjacent blade sets 1 and 2.

The axis of rotation 4 runs vertically and the inner blade-set 1 forms a plurality of conveyor channels 5, curved in vertical planes, in such a way that liquid entering the conveyor channels 5 from below is deflected by approximately 90° in these channels and emerges at the periphery of the rotor in approximately horizontal direction.

The conveyor channels 5 or 6 formed between the individual blade sets 1 and 2 are connected via connecting channels 7 or 8 to the top side of the rotor so that as a result of the suction effect of the liquid flowing through the conveyor channels 5 and 6 an underpressure or region of lower pressure is produced at the mouth of the connecting channels 7 and 8 located in the conveyor channels and, as a result of this, oxygen or an oxygen mixture, for example air, is sucked in and thoroughly mixed with the liquid flowing through the conveyor channels 5 and 6.

In this way the liquid which is to be ventilated is already enriched with oxygen in the inside of the surface ventilation rotor.

The outermost blade-set 2 is provided with an outer wall 9 to form sealed conveyor channels 6. The conveyor channels 5 and 6 of the two adjacent blade sets 1 and 2 run, as can be seen clearly from FIG. 1, in such a way that the liquid flowing through the conveyor channels 5 and 6 which are located adjacent to each other in radial alignment is intensively mixed together directly after emerging from the conveyor channels.

In order that the bearing of the surface ventilation rotor is kept as free as possible in the axial direction, the supporting member 10 of the blade-set is designed to be hollow with the result that the rotor floats. The cavity of the supporting member 10 of the blade-set is so dimensioned that the weight of the ventilation rotor approximates to the buoyancy resulting from the cavity.

Synthetic products are more expediently used as the material for the surface ventilation rotor, more particularly glass fibre-reinforced synthetic resin or stainless steel.

FIG. 2 shows a second embodiment of a surface ventilation rotor, parts corresponding to those in the surface ventilation rotor shown in FIG. 1 having the same reference numbers.

This surface ventilation rotor has three blade sets 1, 2 and 11 which are housed concentrically in respect of each other and adjacent to each other in radial alignment, a dividing wall 3 or 12 being provided in each case between the adjacent blade sets 1 and 2 or 2 and 11.

In this case also when the axis of rotation runs vertically the innermost blade set 1 forms a plurality of conveyor channels 5, curved in vertical planes, and this means that liquid entering into these conveyor channels 5 from below is deflected by approximately 90° in these channels and leaves at the periphery of the rotor in approximately horizontal direction.

The outermost blade set 11 consists of blades 13 which form open conveyor channels 14, seen radially outwards, the blades 13 extending in approximately helical manner along the dividing wall 12 located between the latter and the adjacent blade set 2 and being attached thereto. In order to introduce air into the individual conveyor channels 5, 6 and 14 connecting channels 7, 8 and 15, extending from the latter as far as the surface of the rotor, are provided.

FIG. 3 shows a third embodiment of a surface ventilation rotor in which the supporting member 10 of the blade set has the shape of a cone and the limiting walls 16 and 17, located on the inside and outside, seen in radial alignment, of the conveyor channels 1 and 2 lie in planes having the shape of frusto-conical surfaces.

This results in a surface ventilation rotor which is very easy to make. Depending on the system of unit assembly the same supporting member 10 of the blade set may be used to produce a ventilation rotor with the required oxygen input capacity simply by adding the desired number of blade-sets. It is expedient if the blades of a blade set are attached on the side located outwards, seen in radial alignment, to a wall limiting the blade set. After assembly, this wall then forms the dividing wall between two adjacent blade sets or the outer wall 18. The connecting channels 8 for the air which is to be supplied to the outer conveyor channels 6 may be passed through the blades of the inner blade set face 1.

FIG. 4 shows a further embodiment of a surface ventilation rotor.

In the case of this ventilation rotor the conveyor channels 5 and 6 located adjacent to each other, seen in radial alignment, are, in contradistinction to the example of embodiment shown in FIG. 3, inclined towards each other in a radial plane, and this means that air flowing through the adjacent conveyor channels 5 and 6 is mixed together directly after emerging from the latter.

Additional liquid conveying blades 19 are further provided on the supporting member 10 of the blade set before the inlet apertures of the conveyor channels 5 and 6 in order to accelerate the liquid which is to be conveyed before it enters into the conveyor channels 5 and 6. The cross-section of the additional liquid conveying blades 19 increases continuously from the tip of the supporting member 10 of the blade set up to the inlet apertures of the conveyor channels 5 and 6, with the result that an increasing amount of liquid is accelerated in the same direction.

FIG. 5 shows an embodiment of a surface ventilation rotor in which the top side 20 of the body of the rotor extends over the outlet apertures of the conveyor channels 5 and 6. By means of this part of the wall extending over the outlet apertures of the conveyor channels 5 and 6 the jets of water emerging from the former are limited in respect of their direction upwards and the formation of spray is lessened.

Passage apertures 22 are provided in the area of the leading edge 21 of the blades of the inner blade set 1, the effect of these being that the bubbles of oxygen, or of an oxygen mixture such as for example air, introduced into the liquid in front of the suction aperture of the ventilation rotor, are forced through these apertures 22 during operation and thereby reduced in size, as a result of which the amount of oxygen which is introduced may be improved.

In the embodiment shown in FIG. 6 of a surface ventilation rotor the body of the rotor and the outlet apertures of the conveyor channels 5 and 6 are covered by a stationary cover hood 23, as a result of which the formation of ice on the top side of the rotor in winter may be avoided.

Figure 1:
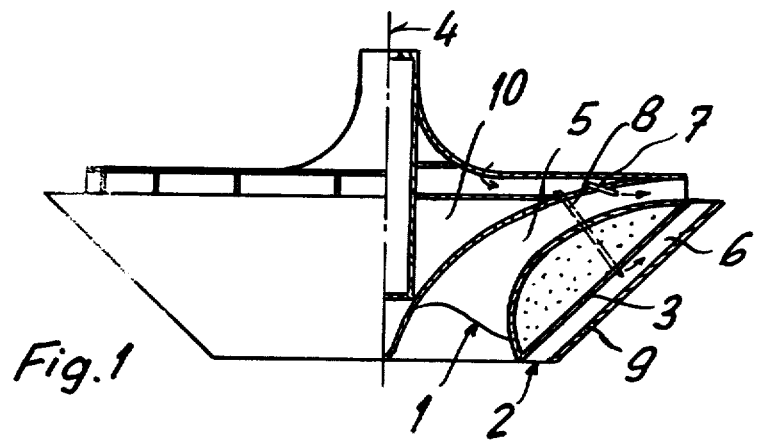
Figure 2:
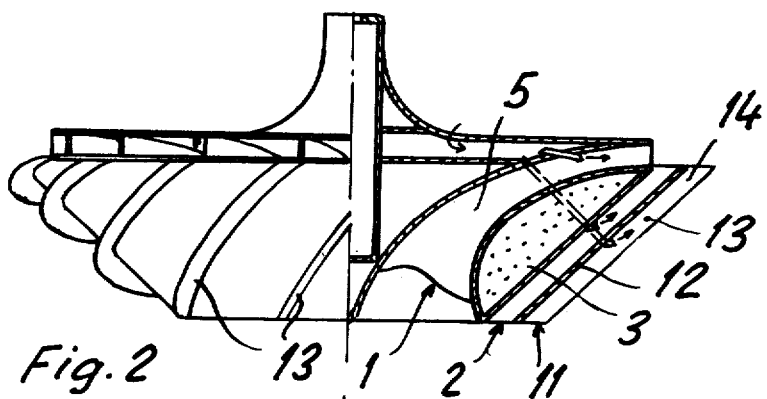
Figure 3:
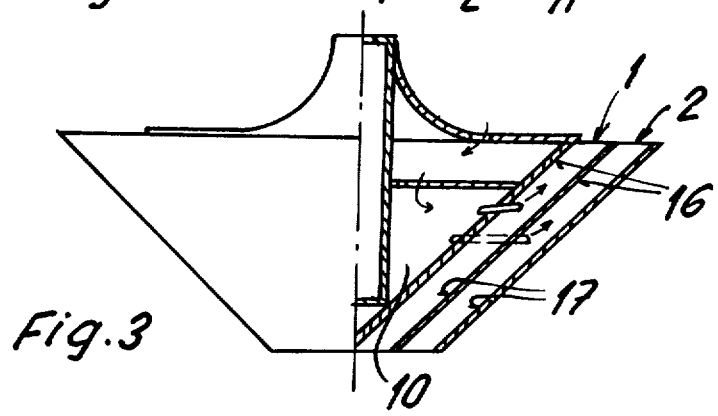
Figure 4:
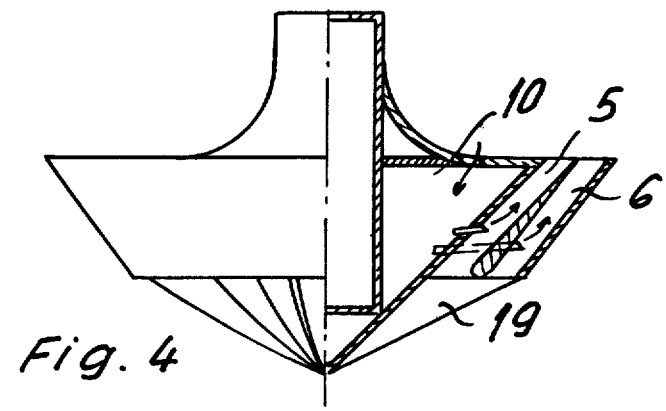
Figure 5:
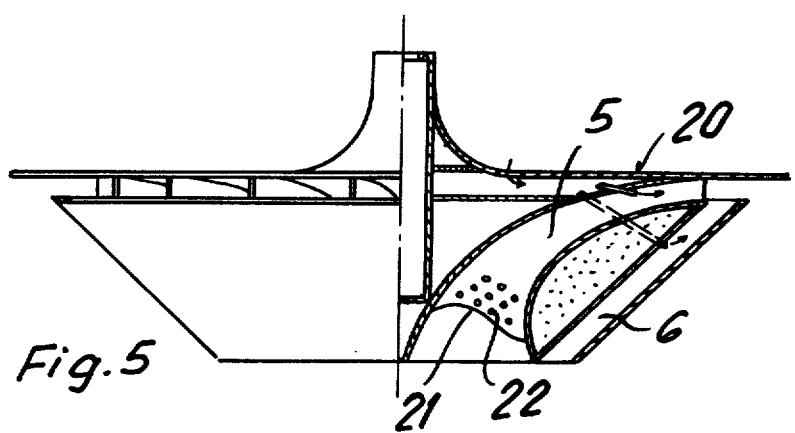
Figure 6:
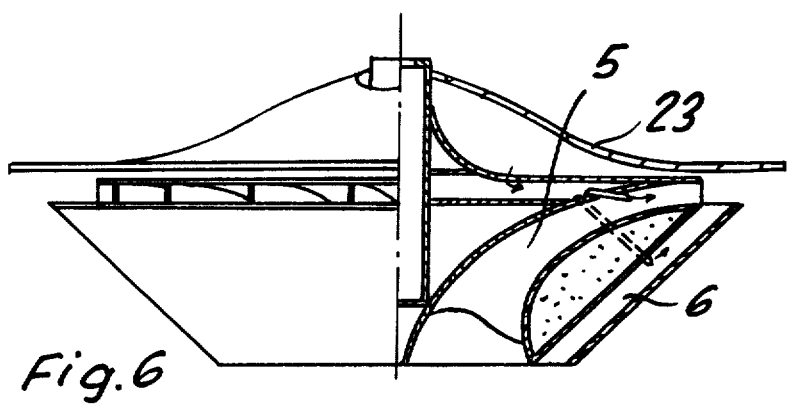
Figure 7:
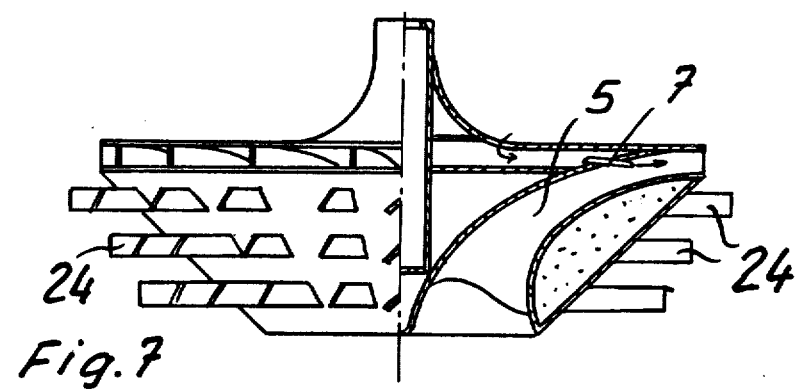
FIG. 7 shows an embodiment of a surface ventilation rotor in which the second blade set is formed by a plurality of projecting blades 24, as in an axial compressor.
Figure 8:
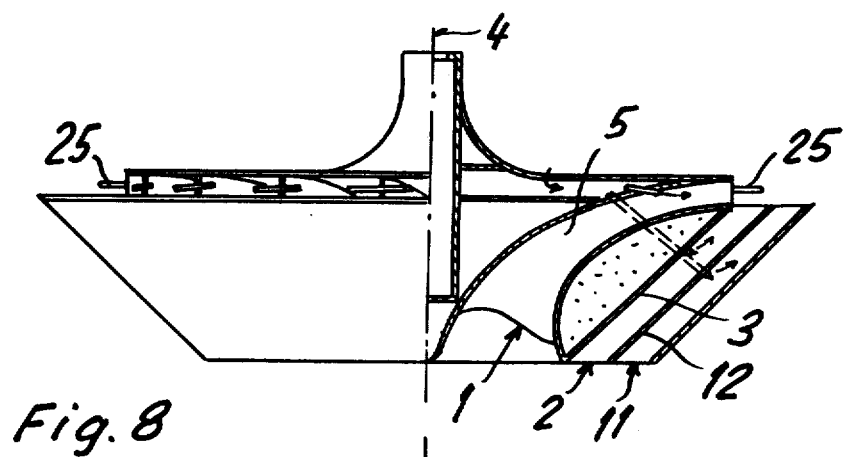
FIG. 8 shows an embodiment of a surface ventilation rotor which is provided with three blade sets 1, 2 and 11 housed concentrically in respect of each other.

If the axis of rotation 4 runs vertically the inner-most blade set 1 forms a plurality of conveyor channels 5, curved in vertical planes, in such a way that liquid entering into the conveyor channels 5 from below is deflected by about 90° in these channels and emerges at the outer periphery of the rotor in approximately horizontal direction. At the trailing edges of the blades of this blade set 1 are housed deflectors 25, each being inclined about an axis of rotation running in radial alignment perpendicular to the axis of rotation 4 of the rotor, these extending in the peripheral rotor direction each over one part of the conveyor channels 5 adjacent to a blade. These deflectors 25 effect an additional distribution of the liquid emerging from the outlet apertures of the conveyor channels 5 and thus increase the liquid surface which consequently comes into contact with the ambient atmosphere.

If the design length of the deflector blades 25 in radial alignment is sufficient these continue to operate additionally as ventilator blades and thus increase the air circulation in the area of the liquid emerging from out of the ventilation rotor, as a result of which the amount of oxygen introduced is improved.

Figure 9:
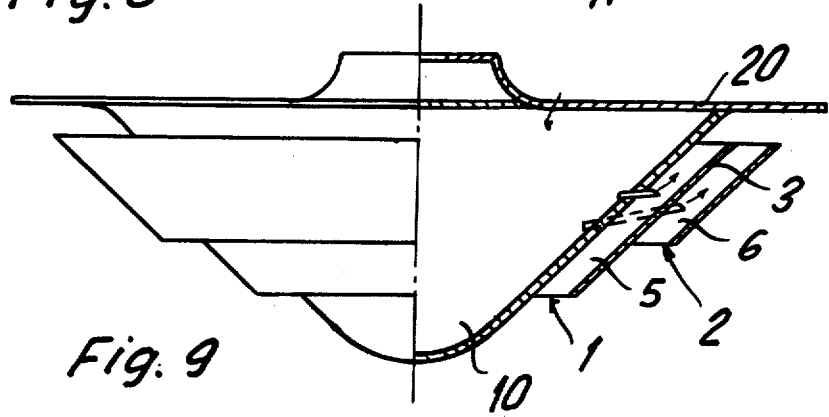

The embodiment shown in FIG. 9 of a surface ventilation rotor has two blade sets 1 and 2 arranged concentrically in respect of each other, the outer conveyor channels 6, seen radially, being shorter than the inner conveyor channels 5, seen radially. It is possible in this way to dimension the conveyor capacity of the outer blade set 2 to be equal to or less than that of the inner blade set 1.

As the dividing wall 3 adjacent to the inlet apertures of the conveyor channels 6 extends even further downwards over the inlet apertures, the liquid which is to be conveyed by means of the conveying channels 6 has already been made to rotate slightly in the area of the overhanging dividing wall 3, and this has a positive effect on the conveying capacity of the blade set 2.

Figure 10:
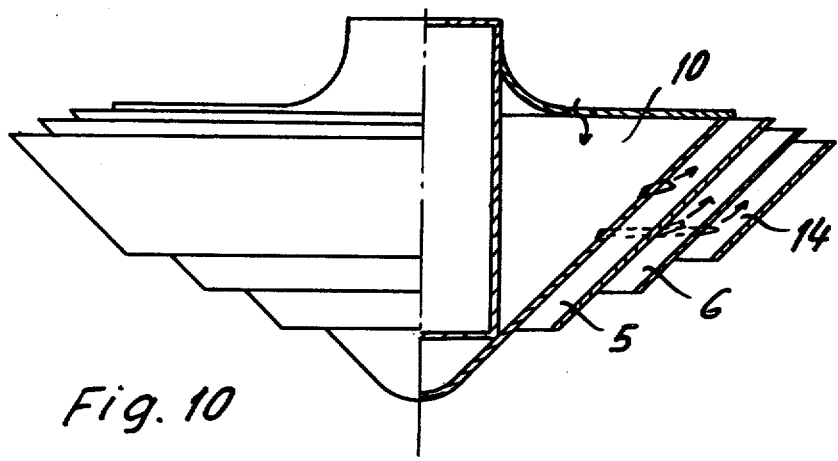

FIG. 10 shows an embodiment of a surface ventilation rotor in which the outlet apertures of the conveyor channels of one blade set 2 or 11 are offset relative to the outlet apertures of the conveyor channels of the adjacent blade set 1 or 2 in a vertical manner, in such a way that if the axis of rotation of the ventilation rotor is vertical the outlet apertures of the inner conveyor channels, seen radially, are located higher up than the outlet apertures of the outer conveyor channels, seen radially. In this way it is possible that the jets of liquid emerging from out of the conveyor channels 5, 6 and 14 which are housed in radial manner one behind the other come into contact with each other for as long as possible or even not at all, with the result that as much as possible of the surface of the liquid conveyed through the ventilation rotor is exposed to the ambient atmosphere.

Figure 11:
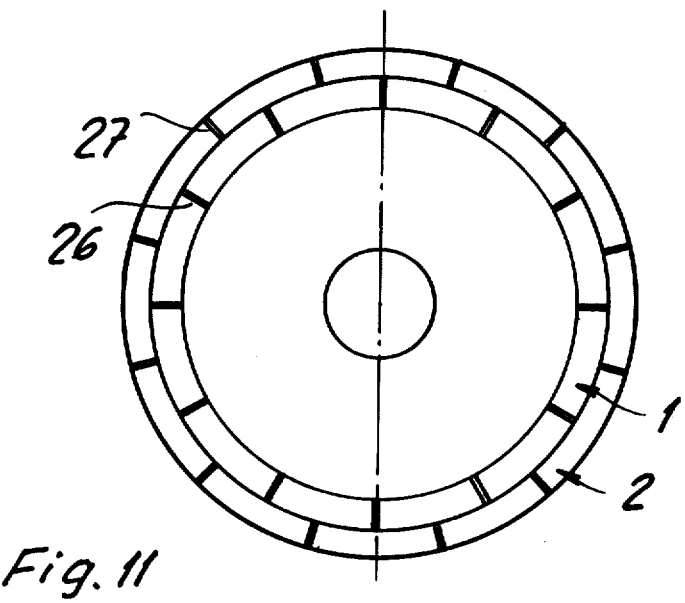

FIG. 11 shows a plan view of an embodiment of a ventilation rotor in which the trailing edges 26 and 27 of the blades of the adjacent blade sets 1 and 2 are offset relative to each other. As the outlet cross-section of the conveyor channels during the operation of the ventilation rotor is never completely filled by the conveyed liquid, it is possible in this way to prevent contact between the jets of liquid emerging from out of the conveyor channels 5 and 6 which are housed in radial manner one behind the other.

I claim:

1. A surface aeration rotor for adding oxygen or an oxygen mixture into waste water which is to be clarified comprising:

means defining at least two annular blade sets each including a plurality of blades defining fluid channels therebetween;

said sets being concentric with respect to each other and housed radially adjacent each other, a dividing wall being disposed between said blade sets;

the innermost channels being curved within vertical planes in such a manner that said waste water entering said innermost channels from a position therebelow is deflected within said innermost channels through an angular displacement of approximately 90° so as to leave said innermost channels and emerge from the periphery of said rotor within paths extending in an approximately horizontal direction; and the outermost channels being inclined vertically upwardly and radially outwardly within vertical planes in such a manner that said waste water entering said outermost channels from a position therebelow is conducted within said outermost channels so as to leave said outermost channels and emerge from said periphery of said rotor within paths which intersect said horizontal exit paths of said innermost channels, whereby intensive mixing of said waste water exiting from said fluid channels occurs immediately subsequent to said emergence of said water from said fluid channels.

2. Rotor according to claim 1, wherein at least one part of the fluid channels formed between the individual blades is connected via connecting channels to the top side of the rotor, so that as a result of the suction effect of the liquid flowing through the fluid channels an underpressure is produced at the mouth of the connecting channels located in the fluid channels and is sucked in by means of this oxygen or an oxygen mixture and is mixed with the liquid flowing through the fluid channels.

3. Rotor according to claim 1, wherein the outermost blade set comprises blades which, seen from the outside in radial direction, form open fluid channels, and wherein the blades extend in an at least approximately helical shape along the dividing wall located between this and the adjacent blade set and are attached to this wall.

4. Rotor according to claim 1, designed as a floating body.

5. Rotor according to claim 1, consisting of synthetic products.

6. Rotor according to claim 1, wherein its top side extends over the outlet apertures of the fluid channels.

7. Rotor according to claim 1, wherein a cover hood is provided which covers the body of the rotor and the outlet apertures of the fluid channels.

8. Rotor according to claim 1, wherein at least one part of the liquid conveyor blades is provided in the area of its leading edge with passage apertures.

9. Rotor according to claim 1, wherein at the trailing edges of the blades of the innermost blade set there are housed deflectors each of which is inclined about an axis of rotation running perpendicular to the axis of rotation of the rotor in radial alignment, or running perpendicular to the axis of rotation of the rotor, each of these extending in the peripheral rotor direction over part of the outlet aperture of at least one of the associated blades of adjacent fluid channels.

* * * * *